United States Patent

[11] 3,528,403

[72] Inventors Denis S. Imredy
Lyme, New Hampshire;
Fred P. Schleipman, Norwich, Vermont
[21] Appl. No. 525,926
[22] Filed Feb. 8, 1966
[45] Patented Sept. 15, 1970
[73] Assignee United States Catheter & Instrument Corporation
Glens Falls, New York
a corporation of Delaware

[54] CATHETER OXYGEN ELECTRODE
12 Claims, 5 Drawing Figs.
[52] U.S. Cl. .................................................. 128/2, 204/195
[51] Int. Cl. .............................................. A61b 5/00

[50] Field of Search ............................ 128/2, 2.05, 2.1, 2.15 (Digest); 73/19, 64.2; 23/(Inquired); 204/195, 195.1

[56] References Cited
UNITED STATES PATENTS
| | | | |
|---|---|---|---|
| 3,211,638 | 10/1965 | Halvorsen ..................... | 204/195 |
| 3,259,124 | 7/1966 | Hillier, et al. ................. | 128/2.1 |
| 2,913,386 | 11/1959 | Clark, Jr. ...................... | 204/195 |

*Primary Examiner*—William E. Kamm
*Attorney*—W. Saxton Seward

ABSTRACT: A catheter-mounted oxygen polarographic electrode for in vivo testing of body fluids having an insulated cathode and uninsulated anode mounted by an insulated plug in an electrolyte-filled cavity and separated from the fluid to be tested by a gas-permeable membrane.

Patented Sept. 15, 1970

INVENTORS
DENIS S. IMREDY
FRED P. SCHLEIPMAN
BY
Dayton R. Stemple, Jr.
ATTORNEY

Patented Sept. 15, 1970

INVENTORS
DENIS S. IMREDY
FRED P. SCHLEIPMAN
BY Dayton R. Stemple, Jr.
ATTORNEY

CATHETER OXYGEN ELECTRODE

This invention relates to new and useful improvements in oxygen polarography in general and particularly seeks to provide a novel electrode construction especially adaptable for use with catheters used for in vivo determinations of oxygen tension in the blood and other fluids of animals, including humans.

It is broadly old to employ polarographic cells in the in vitro determinations of oxygen tension in human blood and other biological fluids. Such cells, or electrodes, generally consist of a platinum cathode and a silver reference anode enclosed within a unit containing an electrolyte bridge and covered at one end by a gas-permeable plastic membrane. The unit is maintained at 0.6 volt potential and the membrane which is an insulator and is not permeable to fluids, separates the specimen from the electrodes so no current can flow into the specimen. When oxygen molecules diffuse from the specimen through the membrane to the polarized cathode surface, the cathode becomes depolarized allowing a current to flow which is directly proportional both to the amount of oxygen contacting the cathode and to the oxygen content of the specimen. This current can be measured and read off or recorded by any suitable indicating device such as a galvanometer.

However, the size, shape and construction of the electrode described above prohibits or severely limits any practical application to in vivo clinical use, in sharp contrast to the fact that in addition to the indispensability of in vitro oxygen polarography there is a steadily increasing demand for measuring the oxygen tension directly and continuously in vivo.

Therefore, an object of this invention is to provide a miniaturized electrode that will function satisfactorily and safely when attached to or in a catheter for in vivo determinations of oxygen tension in blood, lung gases and other biological fluids.

Another object of this invention is to provide an electrode of the general type described which is easy to handle, easy to assemble without special training and which requires only a short assembly time.

Another object of this invention is to provide an electrode, a part of which is a device enabling the safe application and change of the electrolyte and membrane with ease and requiring only negligible time.

Another object of this invention is to provide an electrode of the character stated in which the cathode and anode supporting elements and the capsule cover therefor are fabricated from an inert insulating plastic.

Another object of this invention is to provide an electrode of the character stated which includes an outer tubular capsule or shell having a snugly fitting liner covered at one end by a permanently fused, inert, gas-permeable plastic membrane.

Another object of this invention is to provide an electrode of the character stated in which a platinum-tipped cathode and a silver anode are carried in spaced relationship by an inert insulating plastic plug threadably engaged in that end of the outer capsule opposite from the membrane.

With these and other objects in view, the invention will be more fully understood by reference to the drawings, the accompanying detailed description and the appended claims.

Figure 1:
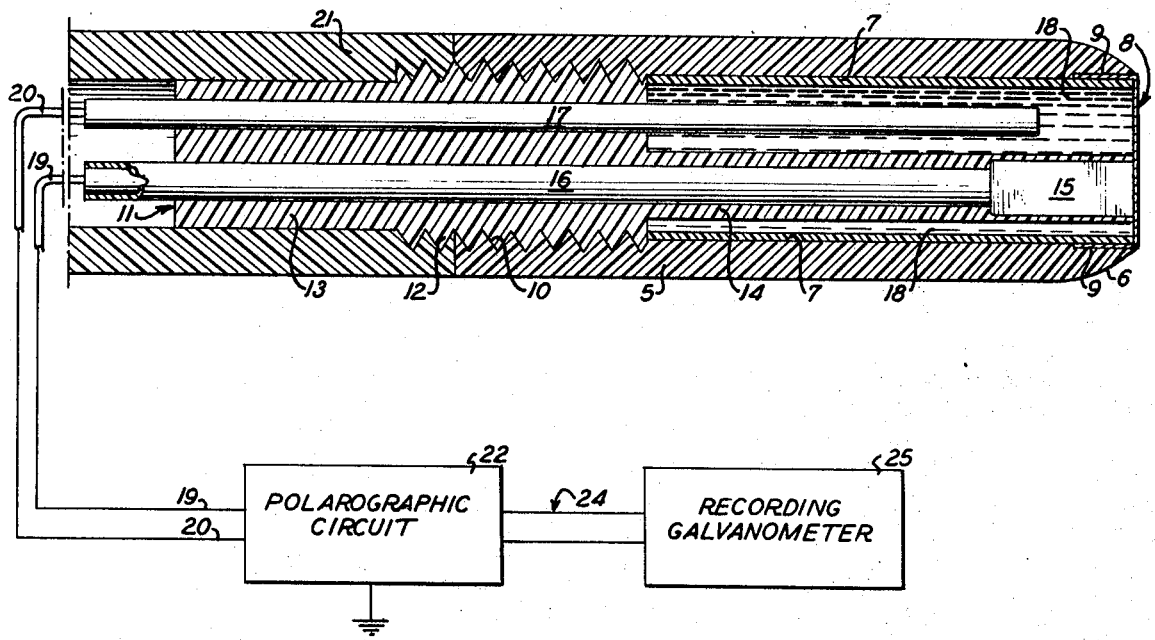
FIG. 1 is a longitudinal vertical section of an electrode constructed in accordance with this invention as attached to a catheter with the electrical circuit diagrammatically shown.
Figure 2:
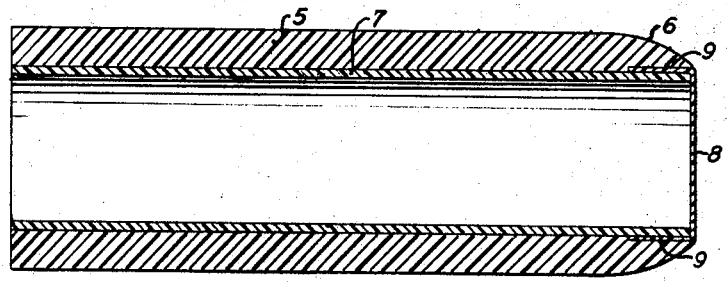
FIG. 2 is a longitudinal vertical section of the outer shell or capsule thereof prior to fusion.
Figure 3:
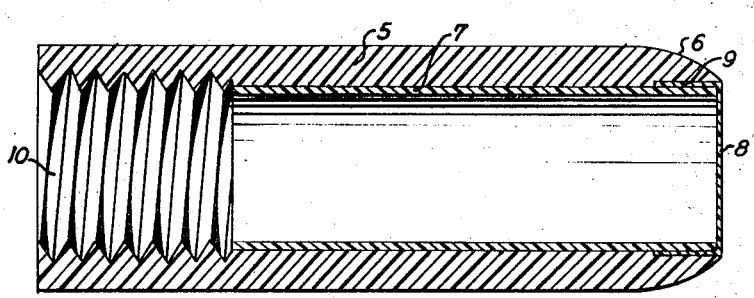
FIG. 3 is a longitudinal section of the shell of FIG. 2 after fusion.
Figure 4:
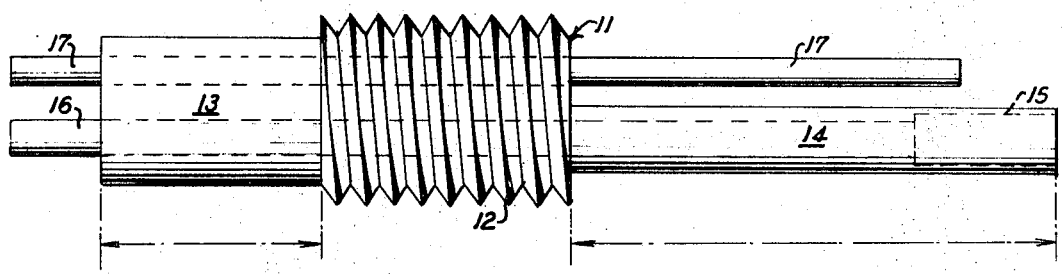
FIG. 4 is a front elevation of the anode and cathode mounting plug therefor.
Figure 5:
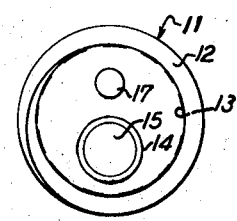
FIG. 5 is a right end elevation of the plug of FIG. 4.

Referring to the drawings in detail, the invention as illustrated is embodied in an electrode assembly including a tubular outer shell or capsule 5 having one end tapered as at 6 and formed from a suitable inert insulating plastic such as Kel-F (3 M's chlorinated fluorocarbon).

A liner 7, formed from the same material as the shell 5, is provided at one end with a Teflon. Du Pont's polytetrafluoroethylene) membrane 8 tightly stretched thereover with an axially extending skirt 9 engaged over the outer end of the liner. Initially the liner and its attached membrane have an outside diameter slightly less than the inside diameter of the shell 5, but following insertion into the shell the liner and membrane skirt 9 are expanded and fused into a permanent bond with the inner wall of the shell. In this way the membrane 8 is stretched taut and retained permanently and safely in place. The membrane may be polyethylene, polypropylene, polyester or any plastic permeable to oxygen that is capable of membrane formation, i.e. generally 0.00025″–0.005″ thick.

Following the insertion into the shell 5 of the liner 7 and membrane 8, a thread is formed (by heat) on the opposite end of shell 5. This thread has an internal diameter equal to the internal diameter of liner 7 and a major diameter that extends into the wall of shell 5. The wall of liner 7 is, therefore, flowed by a heated tool and irremovably locked together with shell 5.

The opposite end of the shell 5 is provided with an internally threaded annular recess 10 having a diameter somewhat greater than the inside diameter of the shell and a depth (axial length) approximately one-third of the length of the shell.

An anode and cathode mounting unit generally indicated at 11 is a one-piece structure also formed from the same plastic as the shell 5 and includes an externally threaded plug portion 12 having a diameter and length to match the dimensions of the shell recess 10. A stem or nipple 13 extends axially from one end of the plug 12 and a rod 14, offset from the longitudinal axis of the plug 12, extends longitudinally from the other end thereof.

The outer end of the rod 14 is drilled axially forming a tube to receive and snugly retain a platinum cathode tip 15 connected to an insulated copper wire 16 which extends through a suitable bore in the unit 11 and terminates in a free end extending somewhat beyond the outer end of the nipple 13.

A silver anode 17 passes through a suitable bore in the unit 11 in spaced parallel relation to the rod 14 and its contained connecting wire 16 so that an exposed end portion, slightly shorter than the rod 14, overlies the same. The other end of the anode 17 extends somewhat beyond the outer end of the nipple 13.

When an electrode constructed in accordance with this invention is assembled for use, a predetermined quantity of electrolyte 18, e.g. KCl, free from air bubbles, is injected into the cavity of the shell 5 and the anode-cathode mounting unit 11 is inserted and threaded to the position shown in FIG. 1 of the drawing. In this assembled state it will be noted that the end of the platinum cathode tip 15 has been moved into contact with the membrane 8 and that the voids in the cavity of the shell 5 not occupied by the rod 14 and anode 17 are completely filled by the electrolyte 18. For further safety a portion of the threaded plug 12 will be screwed into the pre-threaded tip of the catheter.

In use (see FIG. 1) the projecting ends of copper wire 16 and the silver anode 17 are fused or otherwise connected to separate insulated leads 19 and 20 which extend through the entire lumen of a catheter 21 fitted onto the nipple 13 of the electrode, and connect to a polarographic circuit indicated at 22 including a dry cell, this circuit by leads 24 being extended to the recording galvanometer 25. A single or multi-lumen catheter may obviously be utilized that is adapted for various areas or fluids of the body where $O_2$ determination may be desired.

In the illustrated embodiment of this invention the overall length of the electrode varies between 4 and 8 mm., its diameter is equal to the outside diameter of the associated catheter and the diameter of the nipple 13 is equal to or slightly greater than the inside diameter of the catheter in order to assure a firm and tight connection.

This instrument as shown can be used to determine $O_2$ content within the heart, blood vessels, brain, spinal fluid, lungs or any cavity (e.g. determine internal bleeding by finding change in $O_2$ level) or area of the body that can be reached by a catheter.

One of the advantages of the unit described herein is the ease of attaching or replacing the completely sealed electrode unit to the catheter 21 by merely connecting electrodes 16 and 17 to leads 19 and 20 and threading the sealed unit to the catheter. Moreover, this unit is sensitive to high $O_2$ pressure as well as low and the membrane and electrolyte are mechanically stable and not subject to easy breakage.

It is, of course, to be understood that various details of arrangements and proportions of parts may be modified within the scope of the appended claims.

We claim:

1. An electrode for use in oxygen polarography including an elongated tubular insulating plastic shell defining a cavity, a gas-permeable plastic membrane closing one end of said shell, an insulating plastic plug at least partially within and closing the other end of said shell an insulating tube extending through the cavity in said shell from said plug to said membrane, a cathode embedded in and projecting through one end of said tube into contact with the inner face of said membrane, a wire anode embedded in said plug and projecting freely into said cavity in spaced parallel relation to said insulating tube and terminating short of contact with the inner face of said membrane, and an electrolyte filling that part of the cavity of said shell not occupied by said anode, said tube and said cathode.

2. The electrode of claim 1 wherein said cathode additionally includes a tubular insulating plastic liner retained within said shell and said membrane is skirted, cap-shaped and covers one end of said liner, the skirt of said membrane cap being disposed between said shell and said liner, said shell, liner and skirt being firmly bonded together.

3. The electrode of claim 2 wherein said cathode includes a lead projecting through said plug and said tube and a platinum tip in contact with said membrane, and said anode is silver.

4. The electrode of claim 2 wherein said membrane is a plastic.

5. The electrode of claim 2 wherein said membrane is polytetrafluoroethylene.

6. The electrode of claim 2 wherein said shell and liner are (bonded by) each provided with mating threads extending along adjoining surfaces thereof to bond said shell and liner.

7. The electrode of claim 6 wherein said plug is secured to said shell by said threads.

8. The electrode of claim 7 wherein said plug extends outwardly beyond said shell at the end opposed to said membrane and carries exterior threads on said extension.

9. A catheter for use in oxygen polarography including the electrode of claim 1 secured to the distal end of said catheter and insulated leads extending from said cathode and anode through said catheter to the proximal end thereof.

10. A catheter for use in oxygen polarography including the electrode of claim 2 secured to the distal end of said catheter and insulated leads extending from said cathode and anode through said catheter to the proximal end thereof.

11. A catheter for use in oxygen polarography including (an internally threaded) a distal end provided with internal threads, the electrode of claim 8 secured to said distal catheter threads by said plug threads, and insulated leads extending from said cathode and anode through said catheter to the proximal end thereof.

12. The catheter of claim 11 wherein the outer lateral surface of said shell is flush with the outer surface of the distal catheter end.

UNITED STATES PATENT OFFICE
CERTIFICATE OF CORRECTION

Patent No. 3,528,403   Dated September 15, 1970

Inventor(s) Denis S. Imredy and Fred P. Schleipman

It is certified that error appears in the above-identified patent and that said Letters Patent are hereby corrected as shown below:

In the claims:

Claim 6, line 2 should read:

--each provided with mating threads extending--

Claim 11, lines 1 and 2 should read:

--11. A catheter for use in oxygen polarography including a distal end provided with internal--

Signed and sealed this 11th day of April 1972.

(SEAL)
Attest:

EDWARD M. FLETCHER, JR.
Attesting Officer

ROBERT GOTTSCHALK
Commissioner of Patents